US011170486B2

(12) United States Patent
Arikuma

(10) Patent No.: US 11,170,486 B2
(45) Date of Patent: Nov. 9, 2021

(54) IMAGE ANALYSIS DEVICE, IMAGE ANALYSIS METHOD AND IMAGE ANALYSIS PROGRAM

(71) Applicant: NEC Corporation, Tokyo (JP)

(72) Inventor: Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 16/476,316

(22) PCT Filed: Mar. 29, 2017

(86) PCT No.: PCT/JP2017/012956
§ 371 (c)(1),
(2) Date: Jul. 8, 2019

(87) PCT Pub. No.: WO2018/179151
PCT Pub. Date: Oct. 4, 2018

(65) Prior Publication Data
US 2019/0340745 A1    Nov. 7, 2019

(51) Int. Cl.
*G06T 7/00* (2017.01)
*H04N 5/232* (2006.01)
*G06K 9/00* (2006.01)

(52) U.S. Cl.
CPC ........ *G06T 7/0002* (2013.01); *G06K 9/00228* (2013.01); *G06K 9/00268* (2013.01);
(Continued)

(58) Field of Classification Search
CPC ......... G06T 7/0002; G06T 2207/30168; G06T 5/001; G06K 9/00228; G06K 9/00268;
(Continued)

(56) References Cited

U.S. PATENT DOCUMENTS 10,295,704 B2 *   5/2019   Haas ..................... G06T 7/292
10,438,050 B2    10/2019   Watanabe et al.
(Continued)

FOREIGN PATENT DOCUMENTS

JP   2000194861 A   7/2000
JP   2003099763 A   4/2003
(Continued)

OTHER PUBLICATIONS

Pertuz, Said, et al., "Analysis of focus measure operators in shape-from-focus", Pattern Recognition, vol. 46, 2013, pp. 1415-1432 (19 pages).
(Continued)

*Primary Examiner* — Bobbak Safaipour
(74) *Attorney, Agent, or Firm* — Sughrue Mion, PLLC

(57) ABSTRACT

The present invention provides an image analysis device which is capable of automatically responding to various environmental variations caused by a camera installation condition or an environmental factor without consuming unnecessary calculation resources. The image analysis device is provided with: a plurality of process execution units which are capable of executing different processes on an input image; an analysis unit which analyzes, on the basis of the image, an image variation caused by external environment; and a process selection unit which selects, on the basis of the analyzed variation, at least one from among the plurality of process execution units.

8 Claims, 12 Drawing Sheets

(52) U.S. Cl.
CPC ..... *G06K 9/00288* (2013.01); *H04N 5/23229* (2013.01); *G06K 9/00926* (2013.01); *G06T 2207/30168* (2013.01)

(58) Field of Classification Search
CPC ........... G06K 9/00288; G06K 9/00926; G06K 9/522; H04N 5/23229; H04N 5/23222
See application file for complete search history.

(56) References Cited

U.S. PATENT DOCUMENTS

| | | | |
|---|---|---|---|
| 10,613,252 B1* | 4/2020 | Mecikalski | G01W 1/10 |
| 10,713,589 B1 | 7/2020 | Zarandioon et al. | |
| 10,955,586 B2* | 3/2021 | Haas | G06T 7/001 |
| 11,005,868 B2 | 5/2021 | Mathews et al. | |
| 2002/0176610 A1* | 11/2002 | Okazaki | G06K 9/00221 |
| | | | 382/118 |
| 2009/0135269 A1* | 5/2009 | Nozaki | H04N 5/232 |
| | | | 348/222.1 |
| 2011/0014982 A1 | 1/2011 | Hiraishi | |
| 2011/0115920 A1* | 5/2011 | Wang | G06T 7/246 |
| | | | 348/169 |
| 2011/0235905 A1 | 9/2011 | Yokokawa | |
| 2012/0105717 A1 | 5/2012 | Kang | |
| 2014/0259056 A1 | 9/2014 | Grusd | |
| 2015/0221073 A1* | 8/2015 | Matsuyama | G06T 7/246 |
| | | | 348/169 |
| 2016/0133006 A1 | 5/2016 | Li et al. | |
| 2017/0140518 A1 | 5/2017 | Liang et al. | |
| 2019/0228494 A1 | 7/2019 | Stasi et al. | |
| 2019/0230416 A1 | 7/2019 | Yuan | |
| 2019/0297390 A1 | 9/2019 | Grusd | |
| 2020/0050869 A1* | 2/2020 | Aoyama | H04N 5/225 |
| 2021/0128060 A1 | 5/2021 | Sarcinelli et al. | |
| 2021/0142711 A1* | 5/2021 | Maeng | G06N 3/08 |

FOREIGN PATENT DOCUMENTS

| | | | |
|---|---|---|---|
| JP | 2004361522 A | | 12/2004 |
| JP | 20044361522 A | * | 12/2004 |
| JP | 2008204103 A | | 9/2008 |
| JP | 2009245349 A | | 10/2009 |
| JP | 2010146264 A | | 7/2010 |
| JP | 2012099974 A | | 5/2012 |

OTHER PUBLICATIONS

International Search Report and Translation of Written Opinion dated Jul. 4, 2017 from the International Bureau in counterpart International application No. PCT/JP2017/012956.
U.S. Office Action for U.S. Appl. No. 16/662,507 dated May 27, 2021.
Best Rowden, et al. "Automatic face image quality prediction," arXiv preprint arXiv: 1706.09887 (2017). (Year: 2017), pp. 1-13.
Vignesh S, et al. "Face image quality assessment for face selection in surveillance video using convolutional neural networks." 2015 IEEE Global Conference on Signal and Information Processing (Global SIP), IEEE, 2015. (Year 2015), pp. 1-5.
M. Nikitin, et al. "Face quality assessment for face verification in video", (Year: 2014), pp. 111-114.

* cited by examiner

| SORTING FUNCTION | ADDITIONAL ANALYSIS FUNCTION | META DATA | TRANSITION TIME INTERVAL [msec] |
|---|---|---|---|
| SIMPLE SELECTION FILTER | NONE | - QUALITY SCORE | 0 |
| SINGLE OUTPUT FILTER (BRIGHTNESS) | TRACKING | - QUALITY SCORE<br>- BRIGHTNESS INFORMATION OF WHOLE PICTURE<br>- OBJECT CUTOUT PICTURE | 2,000 |
| PLURAL OUTPUT FILTER (BLURRING) | TRACKING | - QUALITY SCORE<br>- BLURRING INFORMATION OF WHOLE PICTURE<br>- OBJECT CUTOUT PICTURE | 2,000 |

FIG. 5

| SORTING FUNCTION | RULE |
|---|---|
| SIMPLE SELECTION FILTER | NONE |
| SINGLE OUTPUT FILTER (BRIGHTNESS) | BRIGHTNESS BIAS > 0.6 |
| PLURAL OUTPUT FILTER (BLURRING) | BLURRING AMOUNT > 0.5 |

FIG. 6

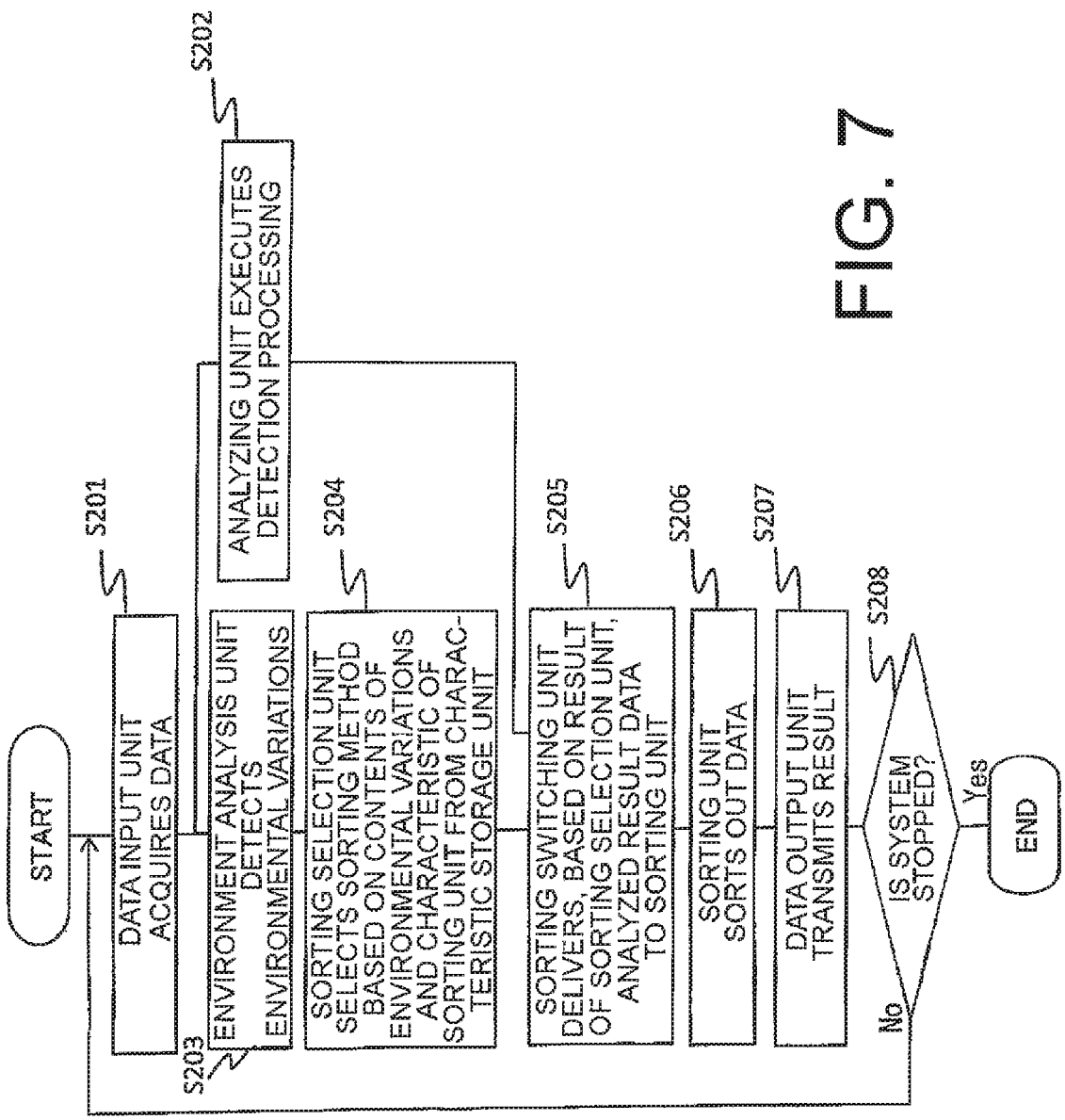

IMAGE ANALYSIS DEVICE, IMAGE ANALYSIS METHOD AND IMAGE ANALYSIS PROGRAM

This application is a National Stage Entry of PCT/JP2017/012956 filed on Mar. 29, 2017, the contents of all of which are incorporated herein by reference, in their entirety.

TECHNICAL FIELD

The present invention relates to an image analysis device, an image analysis method, and an image analysis program.

BACKGROUND ART

Patent Literature 1 describes one example of an image analysis system of a related art. As shown in FIG. 15, the image analysis system of Patent Literature 1 includes a camera 12 for photographing an object, a picture acquiring part 20, a picture correcting part 22, a position detection part 24, and a reliability operation part 26.

The image analysis system of Patent Literature 1 having such a configuration operates as follows.

Specifically, the picture acquiring part 20 takes a picture of a pointing marker as the object. The picture correcting part 22 corrects the picture so as to easily detect the marker. The position detection part 24 estimates a position of the marker in the picture. The reliability operation part 26 calculates a reliability of the position and selects only data having a high reliability.

Patent Literature 2 discloses a "picture recognition system" which adaptively learns and renews recognition units in conformity with various environments and objects so as to enable highly-accurate and robust recognition even in a situation where the recognition units are limited.

The picture recognition system described in Patent Literature 2 basically includes a recognition processing part for processing input picture data in parallel using a plurality of recognition units, an integration part for integrating outputs of the respective recognition units, and a learning part for learnedly renewing the recognition units using teaching data as a target of processing.

The recognition processing part processes the input pictures in parallel with the plurality of recognition units, extracts an object, and produces a processed picture. As the recognition unit, a tree structure picture filter is used which includes a plurality of picture filters combined in a tree structure. In order to deal with various scenes, optimization of the tree structure is previously executed in off-line prior learning and is stocked in a recognition unit database as recognition units specialized for typical scenes, for example, daytime, night, weather, and an environment (an expressway, a main road, an urban area, or the like).

The learning part includes a recognition unit evaluation part for evaluating the individual recognition units, a switching selection part for calculating an optimal combination from all of the recognition units and for switching a combination of currently used recognition units into the optimal combination, and a sequential learning part for creating new recognition units on the basis of the teaching data.

The recognition unit evaluation part individually evaluates, in response to input of the picture serving as the teaching data, a train of tree structure filters currently used and a train of tree structure filters stocked in the recognition unit database.

The switching selection part calculates, among all of trees including currently used trees and stocked trees, a combination of N trees with the highest evaluation.

As regards an optimal combination of trees, evaluation is carried out using an integrated picture of a group of combined trees. For instance, an evaluated value is calculated by comparing the integrated picture with a target picture.

Patent Literature 3 discloses a "picture recognition method and apparatus" for carrying out appropriate picture recognition by automatically processing picture data with a proper algorithm even if there are a lot of kinds of objects and picture data of the objects are varied in characteristics.

The picture recognition apparatus disclosed in Patent Literature 3 includes an imaging camera and a picture processing device. The picture processing device includes an A/D converter, a picture data memory, a central processing unit, a program memory, and first through sixth picture processing modules. Each picture processing module includes a memory and a processing unit.

An object is photographed with the imaging camera. An image signal produced by the imaging camera is supplied to the picture processing device. The supplied image signal is converted into an 8-bit digital signal by the A/D converter and is stored in the picture data memory. The central processing unit sends, in accordance with a program stored in the program memory, the picture data and programs of processing contents (algorithms) to the respective picture processing modules, respectively.

The picture data and the programs of processing contents, which are sent to the respective picture processing modules, are stored in the memories. The processing units process the stored picture data in accordance with the programs of processing contents and inform the central processing unit of results. The respective picture processing modules have different threshold values for binarization.

The central processing unit checks the results of picture processing sent from the respective picture processing modules, selects a picture processing module which produces an optimal solution, and computes a shape and a position (including a posture) of the object by using results thereof to obtain a recognized result.

CITATION LIST

Patent Literatures

PL1: JP 2009-245349 A
PL2: JP 2008-204103 A
PL3: JP 2000-194861 A

Non Patent Literature

NPL 1: Said Pertuz, Domenec Puig, Miguel Angel Garcia, "Analysis of focus measure operators for shape-from-focus", Pattern Recognition, November 2012

SUMMARY OF INVENTION

Technical Problem

Each of Patent Literatures 1-3 mentioned above has a problem which will be described hereinunder.

Patent Literature 1 has a problem that applicable environmental conditions are limited. This is because, in a prior art, picture correction is carried out supposing an environment where a certain restriction is imposed on an installation environment of illumination and a camera, such as an inside of a room of an ordinary home. However, such picture correction is difficult to apply to a use, such as street surveillance, where various environmental variations exist, for example, influence of the installation position or sunshine, strong wind, rainfall, and so on.

Patent Literature 2 merely discloses a technical idea of adaptively learning and renewing the recognition units in conformity with various environments or objects. That is, Patent Literature 2 never sorts out optimal picture data among supplied picture data.

Patent Literature 3 checks the results of picture processing after it is executed in all of the picture processing modules, and selects the picture processing module producing the optimal solution. Consequently, Patent Literature 3 has a problem that consumption of unnecessary calculation resources occurs.

OBJECT OF INVENTION

It is an object of this invention to provide an image analysis device which is capable of resolving any of the above-mentioned problems.

Solution to Problem

An image analysis device of this invention comprises a plurality of process execution units configured to be capable of executing different processes on an image inputted; an analysis unit configured to analyze, on the basis of the image, a variation of the image caused by an external environment; and a process selection unit configured to select, on the basis of the analyzed variation, at least one from among the plurality of process execution units.

Advantageous Effects of Invention

As an advantageous effect of this invention, it is possible to automatically deal with various environmental variations without consuming unnecessary calculation resources.

BRIEF DESCRIPTION OF DRAWINGS

FIG. 5 is a view for explaining an example of sorting characteristic information stored in a characteristic memorizing unit for use in the image analysis device illustrated in FIG. 4;

FIG. 6 is a view for explaining an example of an environment information-sorting function correspondence rule stored in the characteristic memorizing unit for use in the image analysis device illustrated in FIG. 4;

FIG. 7 is a flow chart for illustrating a sorting selection operation of the image analysis device illustrated in FIG. 4;

DESCRIPTION OF EMBODIMENTS

Now, description will be made in detail about example embodiments of this invention with reference to the drawings.

Figure 1:
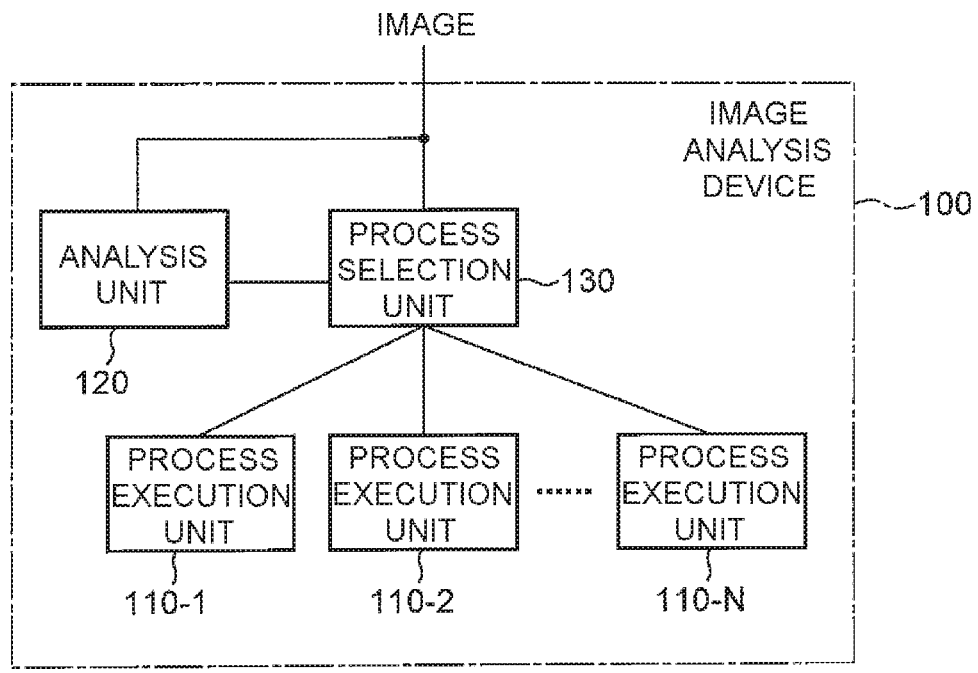
FIG. 1 is a block diagram for illustrating a configuration of an image analysis device according to an example embodiment of this invention.

FIG. 1 is a block diagram for illustrating a configuration of an image analysis device 100 according to an example embodiment of this invention The image analysis device 100 illustrated in the figure includes first through N-th process execution units 110-1, 110-2, . . . , and 101-N, where N represents an integer which is not less than two, an analysis unit 120, and a process selection unit 130.

Each of the first through the N-th process execution units 110-1 to 110-N is capable of executing a different process on an input image. The analysis unit 120 analyzes, on the basis of the image, a variation (including degradation) in the image caused by an external environment. The process selection unit 130 selects, on the basis of the analyzed variation, at least one from among the first through the N-th process execution units 110-1 to 110-N and makes the selected process execution unit execute a process on the image.

As described above, in the example embodiment, all of the first through the N-th process execution units 110-1 to 110-N do not execute the process on the image but a process execution unit to be used is selected before the execution. With this structure, consumption of unnecessary calculation resources is suppressed.

Figure 2:
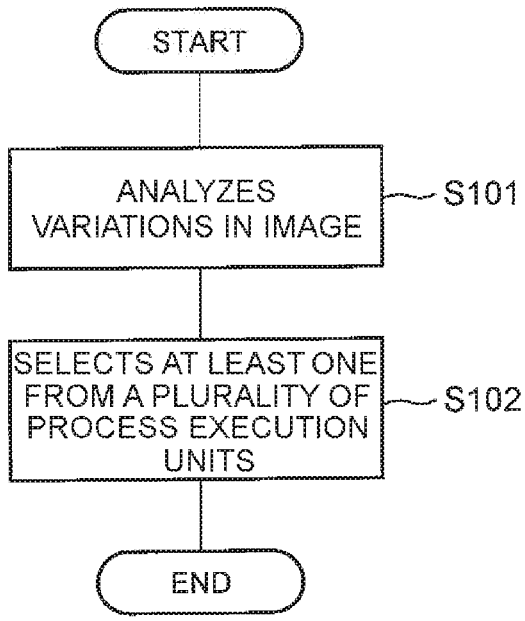
FIG. 2 is a flow chart for illustrating an operation of the image analysis device illustrated in FIG. 1.

Now, referring to FIG. 2, an operation of the image analysis device 100 will be described.

First, the analysis unit 120 analyzes, on the basis of an input image, a variation (including degradation) in the image caused by an external environment (Step S101).

Next, the process selection unit 130 selects, on the basis of the analyzed variation, at least one from among the first through the N-th process execution units 110-1 to 110-N (Step S102).

The respective units (components) of the image analysis device 100 may be implemented by the use of a combination of hardware and software.

Figure 3:
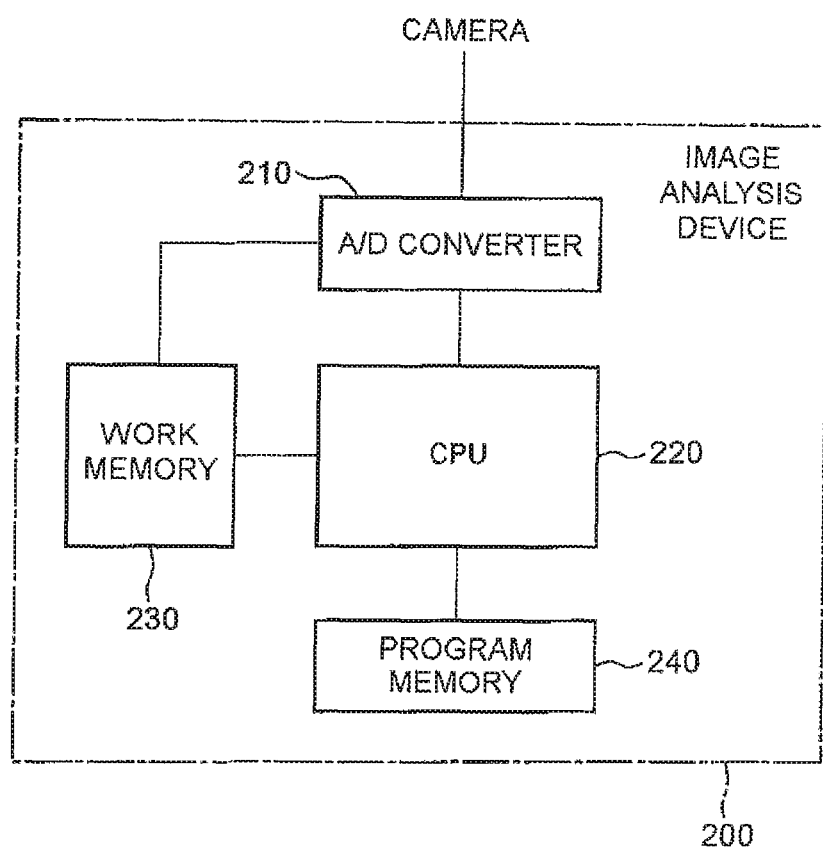
FIG. 3 is a block diagram for illustrating hardware configuration of the image analysis device illustrated in FIG. 1.

FIG. 3 is a block diagram for illustrating an image analysis device 200 representing a mode in which the image analysis device 100 is implemented by combining hardware with software.

The image analysis device 200 illustrated in the figure includes an A/D converter 210, a CPU (central processing unit) 220, a work memory 230, and a program memory 240.

The A/D converter 210 converts an analog image signal imaged by a camera into a digital image signal. The CPU 220 serves as a control unit configured to control an operation of the image analysis device 200. The work memory 230 is, for example, constituted by an RAM (random access memory) and temporarily stores the digital image signal and processed results by the CPU 220. The program memory 240 is, for example, constituted by an ROM (read only memory) or the RAM and stores an image analysis program.

The CPU 220 executes, on the basis of the image analysis program stored in the program memory 240, predetermined processing to thereby implement the respective units (components) as various kinds of means. Furthermore, the image analysis program may be recorded in a recording medium to be distributed. The image analysis program recorded in the recording medium is read into a memory via a wire, wirelessly, or via the recording medium itself to operate the control unit and so on. Examples of the recording medium include an optical disc, a magnetic disk, a semiconductor memory device, and a hard disk.

When the above-mentioned example embodiment is described in another expression, the example embodiment can be implemented by causing a computer, which is to be operated as the image analysis device 200, to operate as the first through the N-th process execution units 110-1 to 110-N, the analysis unit 120, and the process selection unit 130 based on the image analysis program stored in the program memory 240.

In the manner as described above, according to the example embodiment of the present invention, it is possible to automatically deal with a wide variety of environmental variations without consuming unnecessary calculation resources.

Example 1

[Description of Configuration]

New, referring to the drawings, a first example of this invention will be described.

Figure 4:
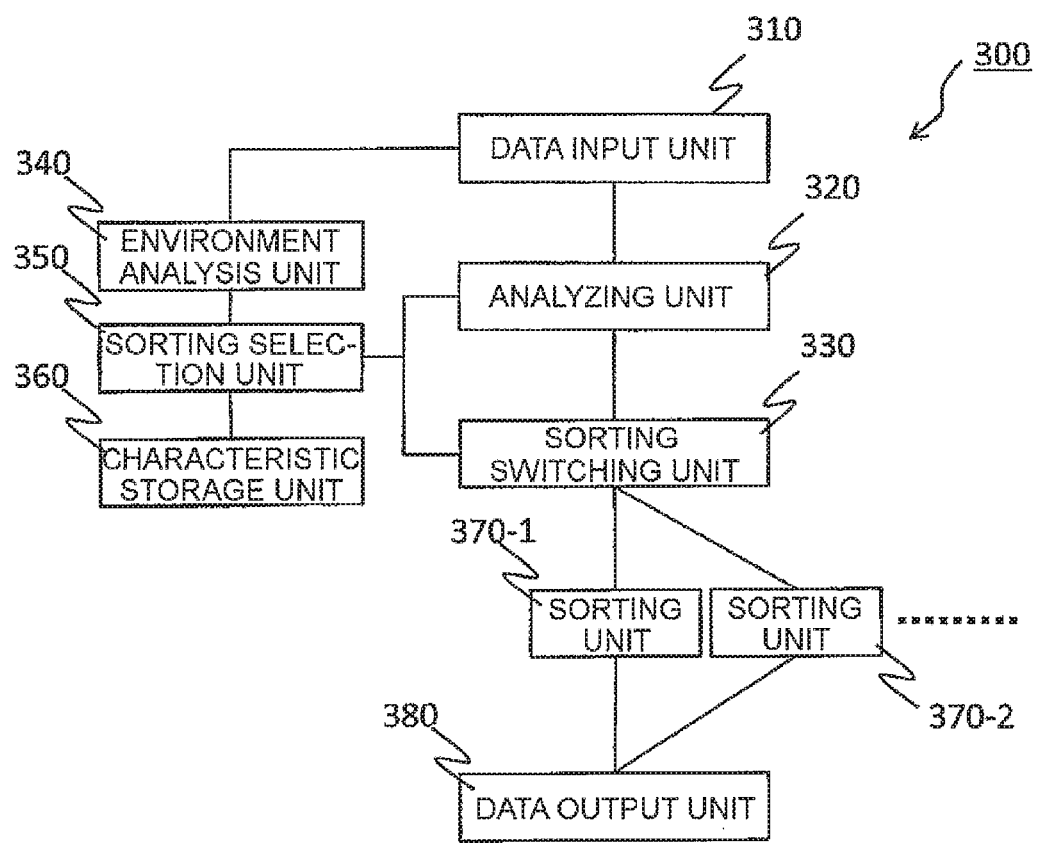
FIG. 4 is a block diagram for illustrating a configuration of an image analysis device according to a first example of this invention.

FIG. 4 is a block diagram for illustrating a configuration of an image analysis device 300 according to a first example of this invention.

Referring to FIG. 4, the image analysis device 300 according to the first example of this invention includes a data input unit 310, an analyzing unit 320, a sorting switching unit 330, an environment analysis unit 340, a sorting selection unit 350, a characteristic storage unit 360, a plurality of sorting units 370-1, 370-2, . . . , and a data output unit 380.

Roughly explaining, each of the above-mentioned means operates as follows.

The data input unit 310 acquires process target data from a data acquiring device, for example, a camera. The analyzing unit 320 receives the data acquired by the data input unit 310 and carries out analyzing processing such as detection of an object in a picture, detection of an abnormal sound in a voice, and so on. When data for additional analysis is specified from the sorting selection unit 350, the analyzing unit 320 carries out the additional analysis to be added to a result.

The sorting switching unit 330 switches delivery of data so as to deliver the result of the analyzing unit 320 to a sorting unit 370 specified by the sorting selection unit 350.

The environment analysis unit 340 receives the data acquired by the data input unit 310 and analyzes environment information such as brightness and blurring in the image. It is noted here that an analysis of the environment information need not be carried out for all of input data and may be carried out at any desired execution frequency in accordance with contents of the environment analysis, for example, by periodic sampling. The sorting selection unit 350 selects an optimal sorting unit 370 in accordance with the environment information analyzed by the environment analysis unit 340, and sorting characteristic information and an environment information-sorting function correspondence rule which are stored in the characteristic storage unit 360. When any additional analysis is required in the selected sorting, the sorting selection unit 350 requests the analyzing unit 320 to carry out the additional analysis.

Accordingly, the plurality of sorting units 370 serve as the process execution units 110-1 to 110-N in FIG. 1. A combination of the environment analysis unit 340 and the characteristic storage unit 360 serves as the analysis unit 120 in FIG. 1. Furthermore, the sorting selection unit 350 serves as the process selection unit 130 in FIG. 1.

FIG. 5 is a view for illustrating an example of the sorting characteristic information stored in the characteristic storage unit 360. FIG. 6 is a view for illustrating an example of the environment information-sorting function correspondence rule stored in the characteristic storage unit 360.

As shown in FIG. 5, the characteristic storage unit 360 memorizes, as the sorting characteristic information, sorting function information for specifying the sorting function, additional analysis function information indicative of the additional analysis function to be requested to the analyzing unit 360, meta data indicative of data used in the sorting, and a transition time interval indicative of a time interval required for switching of the sorting function. It is noted here that, as the sorting function, not only a string of characters indicative of the function but also a numerical value or a flag may be used. As the additional analysis function, not only a string of characters indicative of the function but also a numerical value or a flag may be used. As the meta data, not only a string of characters indicative of a data type but also a numerical value or a flag may be used.

As shown in FIG. 6, the characteristic storage unit 360 memorizes, as the environment information-sorting function correspondence rule, the sorting function information for specifying the sorting function and rule information indicative of the rule for selecting the sorting. It is noted here that, as the sorting function, not only a string of characters indicative of the function but also a numerical value or a flag may be used. As the rule, not only a simple threshold expression but also a selection algorithm by a decision tree or machine learning, and so on may be used.

Each of the sorting units 370-1, 370-2, . . . decides, on the basis of the analyzed result produced by the analysis unit 120, the analyzing unit 320, and the meta data thereof, whether the analyzed result is produced or discarded. The data output unit 380 outputs the received sorted data to an external system.

[Description of Operation]

Next referring to FIG. 4 and a flow chart of FIG. 7, description will be made in detail about a whole operation of the image analysis device 300 according to the first example.

First of all, the data input unit 310 acquires object data from the camera or the like (Step S201 in FIG. 7).

Subsequently, the analyzing unit 320 analyzes the object data to obtain analyzed result data (Step S202 in FIG. 7). In this event, if the additional analysis is designated by the sorting selection unit 350, the analyzing unit 320 carries out the additional analysis together (Step S201 in FIG. 7).

At the same time, the environment analysis unit 340 analyzes the object data to obtain the environment information (Step S203 in FIG. 7). The sorting selection unit 350 selects the sorting unit 370 in accordance with the environment information analyzed by the environment analysis unit 340, and the sorting characteristic information and the environment information-sorting function correspondence rule which are stored in the characteristic storage unit 360 (Step S204 in FIG. 7).

The sorting switching unit 330 delivers the analyzed result data produced by the analyzing unit 320 to the sorting unit 370 decided by the sorting selection unit 350 (Step S205 in FIG. 7). The sorting unit 370 carries out the sorting processing on the received analyzed result data and sorts out the analyzed result data required for maintenance of accuracy (Step S206 in FIG. 7). The data output unit 380 transmits, to the external system, the sorted analyzed result data received (Step S207 in FIG. 7). Until the system is stopped, the above-mentioned steps S201 to S207 are repeated (Step S208 in FIG. 7).

Although the step S202 and the steps S203 and S204 operate in parallel in the above-mentioned operation example, those steps may operate in series.

[Description of Operation Example]

Next, an example of the sorting selection processing by the sorting selection unit 350 will be described. It is assumed here that face authentication from a surveillance image is carried out and that a system includes detection of a face from the image, extraction of features from the face, and DB (database) collation is used. Furthermore, it is assumed that the detection of the face is achieved by using the first example.

Figure 8:
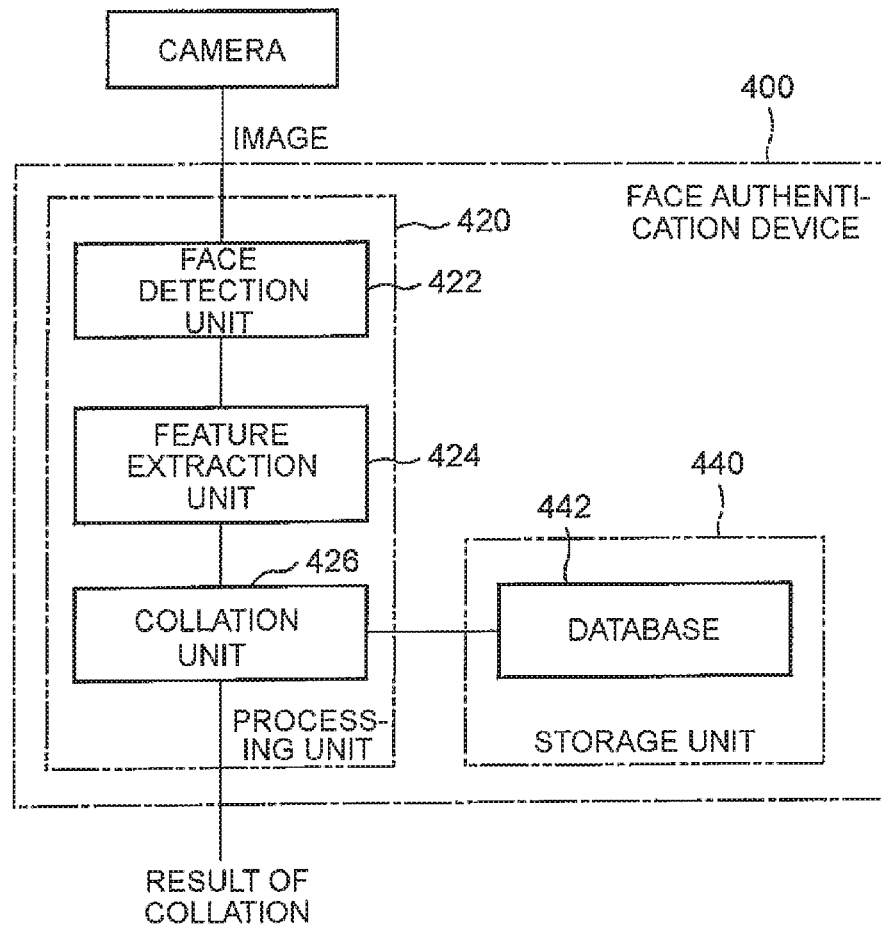
FIG. 8 is a block diagram of a face authentication device to which the image analysis device illustrated in FIG. 1 is supposed to be applied.

FIG. 8 is a block diagram for illustrating a configuration of a face authentication device 400 assumed in the foregoing. The face authentication device 400 includes a processing unit 420 and a storage unit 440. The processing unit 420 includes a face detection unit 422, a feature extraction unit 424, and a collation unit 426.

The storage unit 440 includes a database 442 for registering reference features each of which indicates a feature of a face in a person to be authenticated.

The face detection unit 422 detects the face from the image taken by the camera. The image analysis device 300 illustrated in FIG. 4 is used as the face detection unit 422. The feature extraction unit 424 extracts the feature of the detected face. The collation unit 426 collates the extracted feature with reference features registered in the database 442 to carry out the face authentication.

In the manner as described above, the image analysis device 300 according to the first example assumes the detection of the face by the face detection unit 422. In the face detection unit 422, for the surveillance image acquired by the data input unit 310, the analyzing unit 320 carries out detection processing of the face. Herein, it is assumed that the plurality of sorting units 370 include first through third sorting units 370-1, 370-2, and 370-3. The first sorting unit 370-1 uses a simple selection filter. The second sorting unit 370-2 uses a single output filter relating to brightness. The third sorting unit 370-3 uses a plural output filter relating to blurring.

The simple selection filter is a simple selection filter configured to output the face having high quality which is not less than a predetermined threshold value. The single output filter is a single output filter configured to select only one face having the highest quality value among the faces of the same person detected during a past given time interval. The plural output filter is a plural output filter configured to select a plurality of faces each having a high quality value among the faces of the same person detected during the past given time interval.

Figure 9:
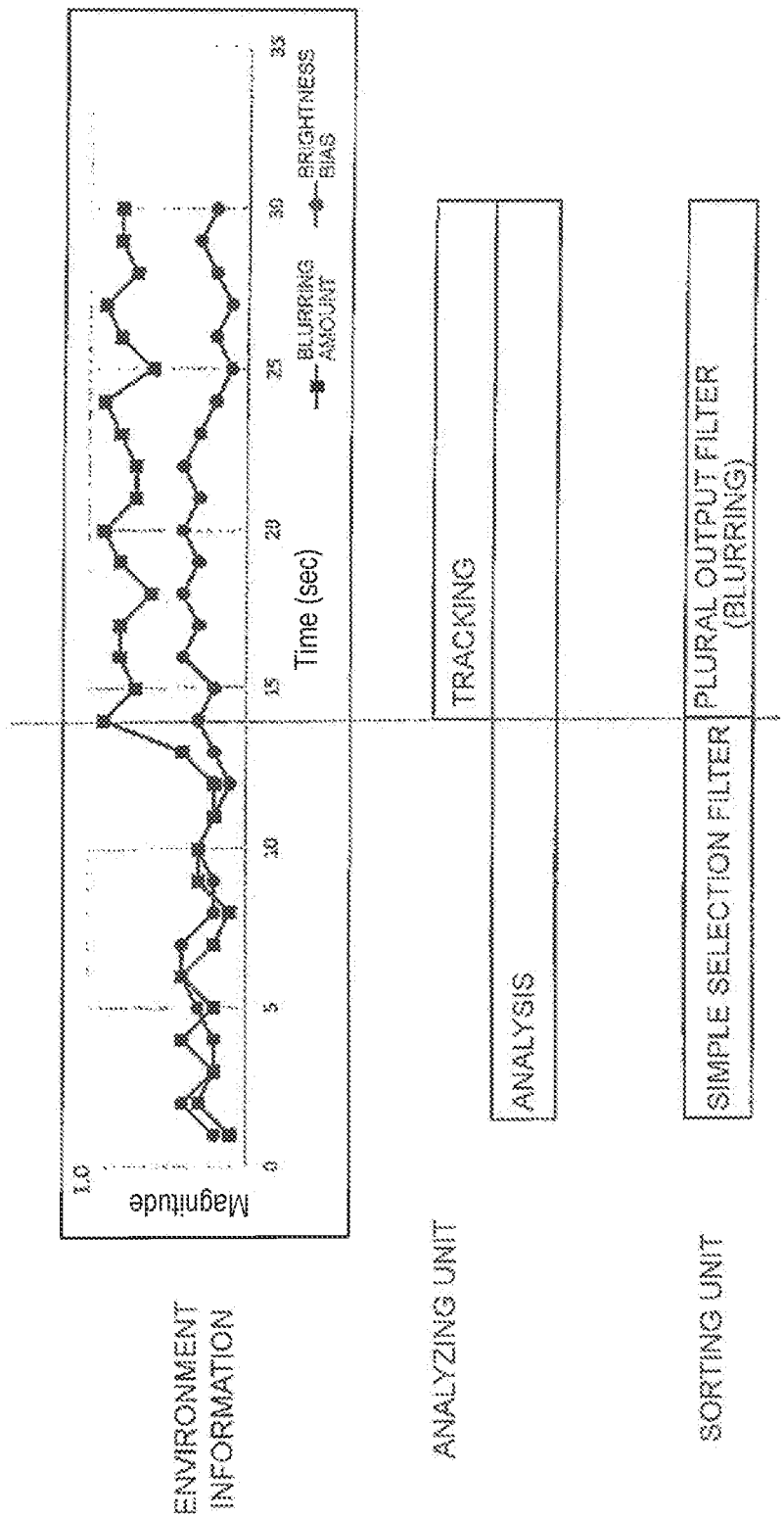
FIG. 9 is a concept view of environment information for illustrating an operation of a sorting switching unit for use in the image analysis device illustrated in FIG. 4.

Referring to FIGS. 5, 6, and 9, description will proceed to processing of the sorting selection unit 350 selecting, in a case of the three sorting units 370-1, 370-2, and 370-3, the optimal sorting unit 370 in accordance with the environment information. Herein, description will proceed assuming that, as an initial state, the first sorting unit (simple selection filter) 370-1 operates as the sorting unit 370.

First, the data input unit 310 divides the image acquired from the camera into frame pictures which are sent to the analyzing unit 320 and the environment analyzing analysis unit 340. The analyzing unit 320 carries out the face detection on the received pictures to produce a plurality of detected faces as the analyzed result data together with quality scores for the respective faces.

On the other hand, the environment analysis unit 340 analyzes the frame pictures produced by the data input unit 310 to produce the environment information. For example, the environment analysis unit 340 analyzes information of a blurring amount of the image and brightness bias, as shown in FIG. 9, per each frame picture or periodically to produce the analyzed information as the environment information.

FIG. 9 shows a time-based graph where the abscissa represents a time in seconds and the ordinate represents the blurring amount and a magnitude of the brightness bias, and an example of states of the analyzing unit 320 and the sorting unit 370 at that time. FIG. 9 shows the blurring amount and the magnitude of the brightness bias each of which is normalized so that the maximum value is equal to 1.0.

The blurring amount may be estimated, for example, by Fourier transforming the input picture and deciding the blurring if a ratio of low frequency components is greater. Such a method of estimating the blurring amount is reported by the Non-Patent Literature 1 mentioned above. On the other hand, the brightness bias may be estimated, for example, by calculating a brightness histogram in the picture and detecting the brightness bias in a case where there are a greater amount of low-brightness pixels or a greater amount of high-brightness pixels.

Next, the sorting selection unit 350 selects the optimal sorting unit 370 on the basis of the environment information analyzed by the environment analysis unit 340, and the sorting characteristic information (FIG. 5) and the environment information-sorting function correspondence rule (FIG. 6) which are stored in the characteristic storage unit 360.

For instance, in the example of the environment information illustrated in FIG. 9, both of brightness and the blurring amount are low from a time instant 1 to a time instant 13. Therefore, the sorting selection unit 350 selects the simple selection filter because rules for both of the single output filter (brightness) and the plural output filter (blurring) are not satisfied in the environment information-sorting function correspondence rule in FIG. 6. The sorting switching unit 330 delivers, in accordance with selection by the sorting selection unit 350, the analyzed result data produced by the analyzing unit 320 to the first sorting unit 370-1 using the simple selection filter. The first sorting unit 370-1 using the simple selection filter compares a quality score of each face included in the supplied analyzed result data with the predetermined threshold value and sends the analyzed result data to the data output unit 380 if the quality score is not less than the threshold value. As a result, in a case where the influence on accuracy due to the environment is low, only a high-quality face using a high threshold value is selected. Accordingly, in the feature extraction (424 in FIG. 8) from the faces and the DB collation (426 in FIG. 8) in a latter part, the face authentication with high recall and precision can be achieved using the face picture having the high quality.

When the blurring amount is as large as 0.9 at a time instant 14, the sorting selection unit 350 selects the third sorting unit 370-3 using the plural output filter because a rule for the plural output filter (blurring) is satisfied in the environment information-sorting function correspondence rule in FIG. 6. The analyzing unit 320 carries out, together with the above-mentioned face detection, a tracking analysis for extracting tracking information of the same face among the frame pictures specified by the sorting selection unit 350. The sorting switching unit 330 delivers, in accordance with selection of the sorting selection unit 350, the analyzed result data produced by the analyzing unit 320 to the third sorting unit 370-3 using the plural output filter. The third sorting unit 370-3 using the plural output filter maintains the same face during the past given time interval using a tracked result included in the supplied analyzed result data, and delivers, to the data output unit 380, one having the highest quality score thereamong. As a result, even in a photographing condition where the image is blurred under the influence of wind and so on and the face having the high quality is not picked up, a plurality of faces each having a good quality are selected thereamong as candidates. Accordingly, in the feature extraction from the faces (424 in FIG. 8) and the DB collation (426 in FIG. 8) in a latter part, it is possible to achieve the face authentication with the recall maintained even if the environment has unfavorable conditions.

[Description of Effect]

Next, an effect of the first example embodiment will be described.

According to the first example, the sorting selection unit 350 selects the optimal sorting unit 370 on the basis of the environment information analyzed by the environment analysis unit 340. Therefore, it is possible to provide the analyzed result data required to maintain the accuracy in recall and so on even in a case where various environmental variations such as influences of an installation position and sunshine, strong wind, rainfall, and so on exist as in the street surveillance.

Respective parts (respective components) of the image analysis device 300 may be implemented by using a combination of hardware and software, as shown in FIG. 3. In a form in which the hardware and the software are combined, the respective parts (the respective components) are implemented as various kinds of means by storing an image analysis program in the program memory 240 and making the hardware of the CPU 220 operate based on the image analysis program. The image analysis program may be recorded in a recording medium to be distributed. The program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned first example in another expression, the first example can be implemented by making a computer to be operated as the image analysis device 300 act as the data input unit 310, the analyzing unit 320, the sorting switching unit 330, the environment analysis unit 340, the sorting selection unit 350, the characteristic storage unit 360, the plurality of sorting units 370, and the data output unit 380 according to the image analysis program stored in the program memory 240.

Example 2

[Description of Configuration]

New, referring to the accompanying drawings, a second example of this invention will be described in detail.

Figure 10:
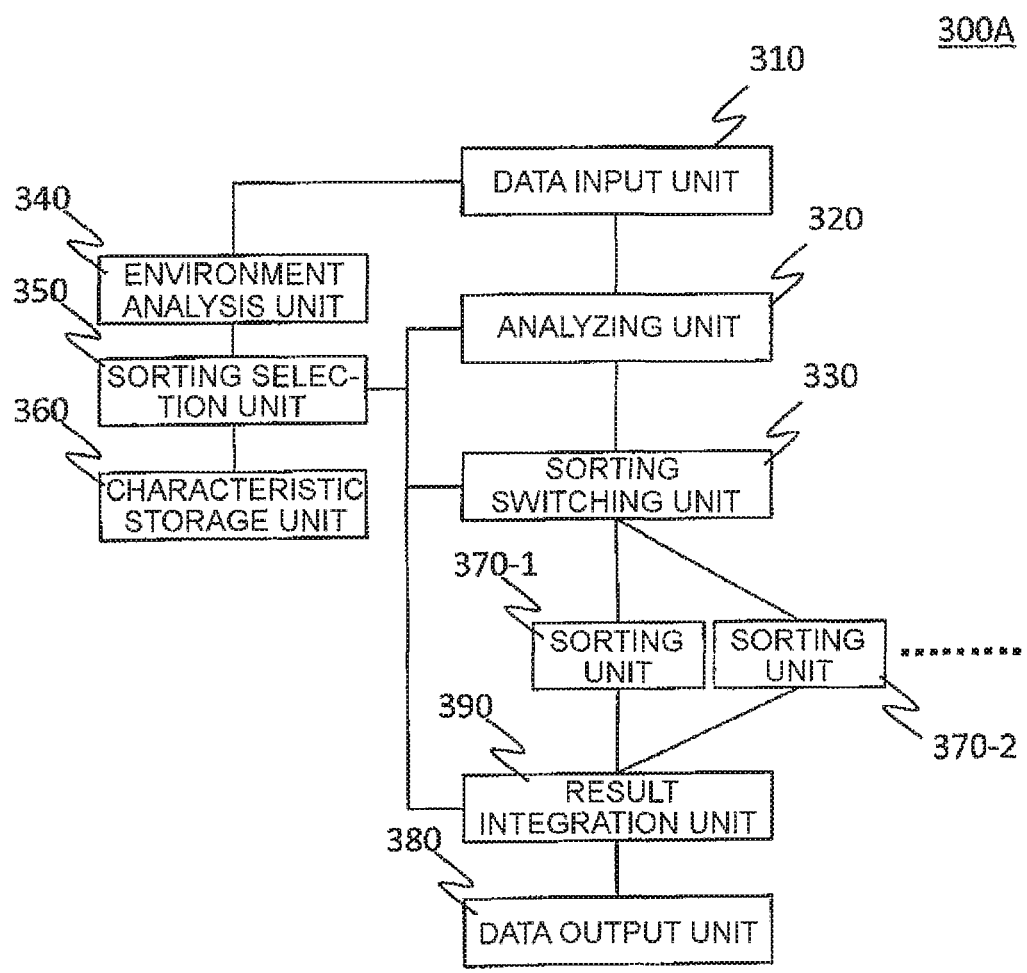
FIG. 10 is a block diagram for illustrating a configuration of an image analysis device according to a second example of this invention.

FIG. 10 is a block diagram for illustrating a configuration of an image analysis device 300A according to the second example of this invention.

Referring to FIG. 10, the image analysis device 300A according to the second example of this invention includes, in addition to the configuration of the first example, a result integration unit 390 connected between the sorting units 370 and the data output unit 380.

[Description of Operation]

Roughly explaining, those means operate as follows, respectively.

The sorting selection unit 350 selects a plurality of sorting units 370 in accordance with the environment information analyzed by the environment analysis unit 340, sorting characteristic information and the environment information-sorting function correspondence rule which are stored in the characteristic storage unit 360.

The result integration unit 390 integrates, in accordance with results selected by the plurality of sorting units 370 and weighting specified by the sorting selection unit 350, analyzed result data to be finally produced and sends integrated analyzed result data to the data output unit 380.

Next referring to flow charts in FIG. 11 and FIG. 12, description will be made in detail about a whole operation of the image analysis device 300A according to the second example.

Figure 11:
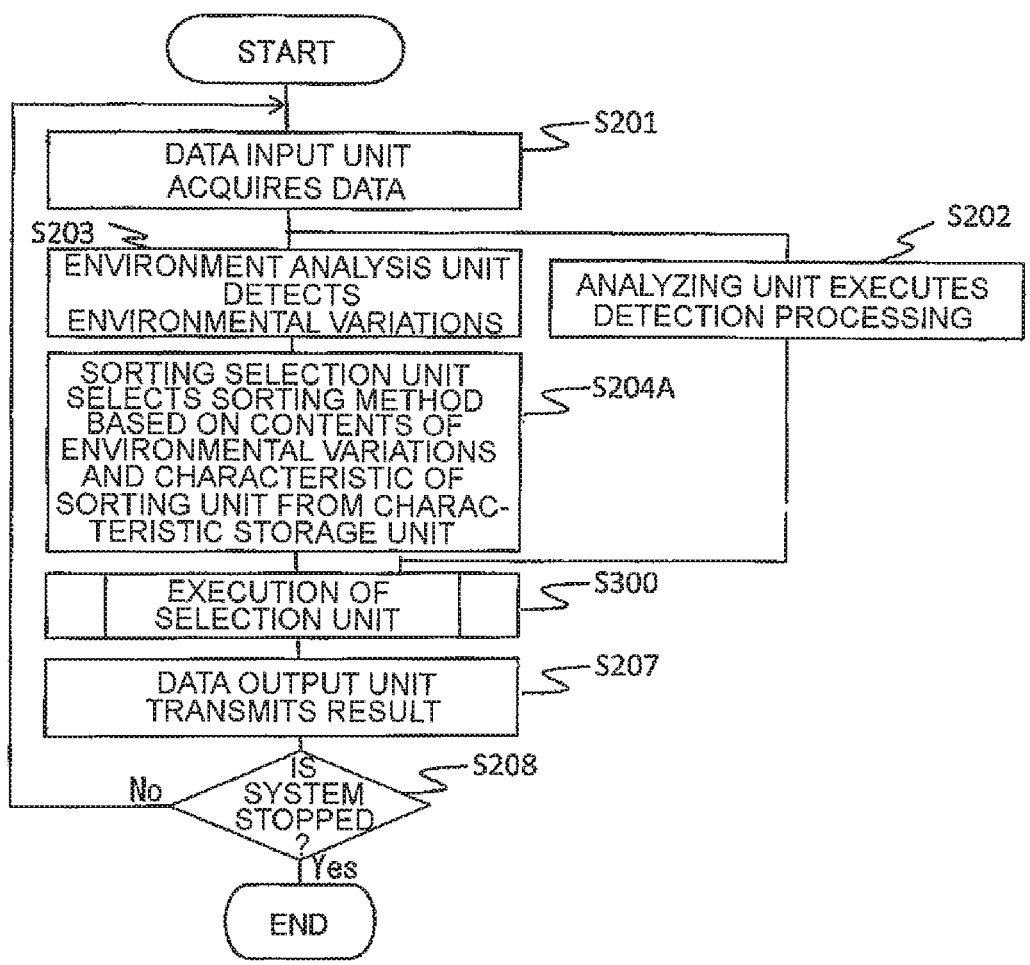
FIG. 11 is a flow chart for illustrating a sorting selection operation of the image analysis device illustrated in FIG. 10.

First, the sorting selection unit 350 selects one or more sorting units 370 in accordance with the environment information produced by the environment analysis unit 340, and the sorting characteristic information and the environment information-sorting function correspondence rule which are stored in the characteristic storage unit 360 (Step S204A in FIG. 11).

Figure 12:
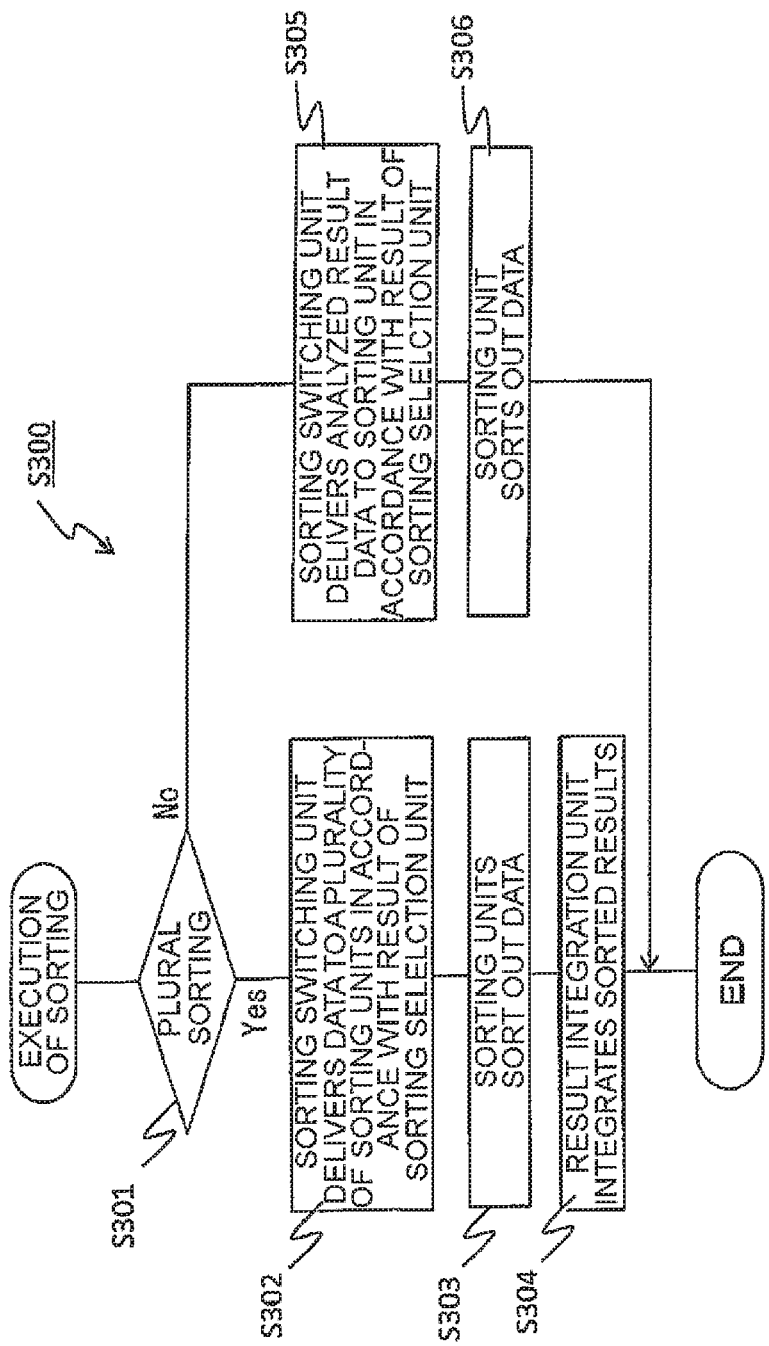
FIG. 12 is a flow chart for illustrating a sorting operation of the image analysis device illustrated in FIG. 10.

FIG. 12 is a flow chart for use in explaining an operation of selection execution (Step S300) in the sorting selection unit 350 in FIG. 11.

Next, when only one sorting unit 370 is selected (No in Step S301), the single sorting unit sorts the analyzed result data in the manner similar to the above-mentioned first example (Steps S301, S305, and S306 in FIG. 12).

On the other hand, when a plurality of sorting units 370 are selected (Yes in Step S301), the sorting switching unit 330 delivers the analyzed result data to the plurality of sorting units 370 (Step S302 in FIG. 12). Receiving the data, each sorting unit 370 carries out sorting processing and delivers a result to the result integration unit 390 (Step S303 in FIG. 12). The result integration unit 390 integrates, in accordance with results selected by the plurality of sorting units 370 and the weighting specified by the sorting selection unit 350, the analyzed result data to be finally produced and sends the integrated analyzed result data to the data output unit 380 (Step S304 in FIG. 12).

[Description of Operation Example]

Next, an example of integration processing for plural sorting processing by the result integration unit 390 will be described. Herein, with reference to FIGS. 10 and 13, face detection processing will be described as regards a case of executing the plurality of sorting units 370 in consideration of a transition time interval until the sorting units 370 produce stable results. Herein, description will be made assuming that, as an initial state, the first sorting unit 370-1 using the simple selection filter operates as the sorting unit 370.

First, the sorting selection unit 350 selects the sorting kinds units on the basis of the environment information analyzed by the environment analysis unit 340 and the environment information-sorting function correspondence rule stored in the characteristic storage unit 360.

Figure 13:
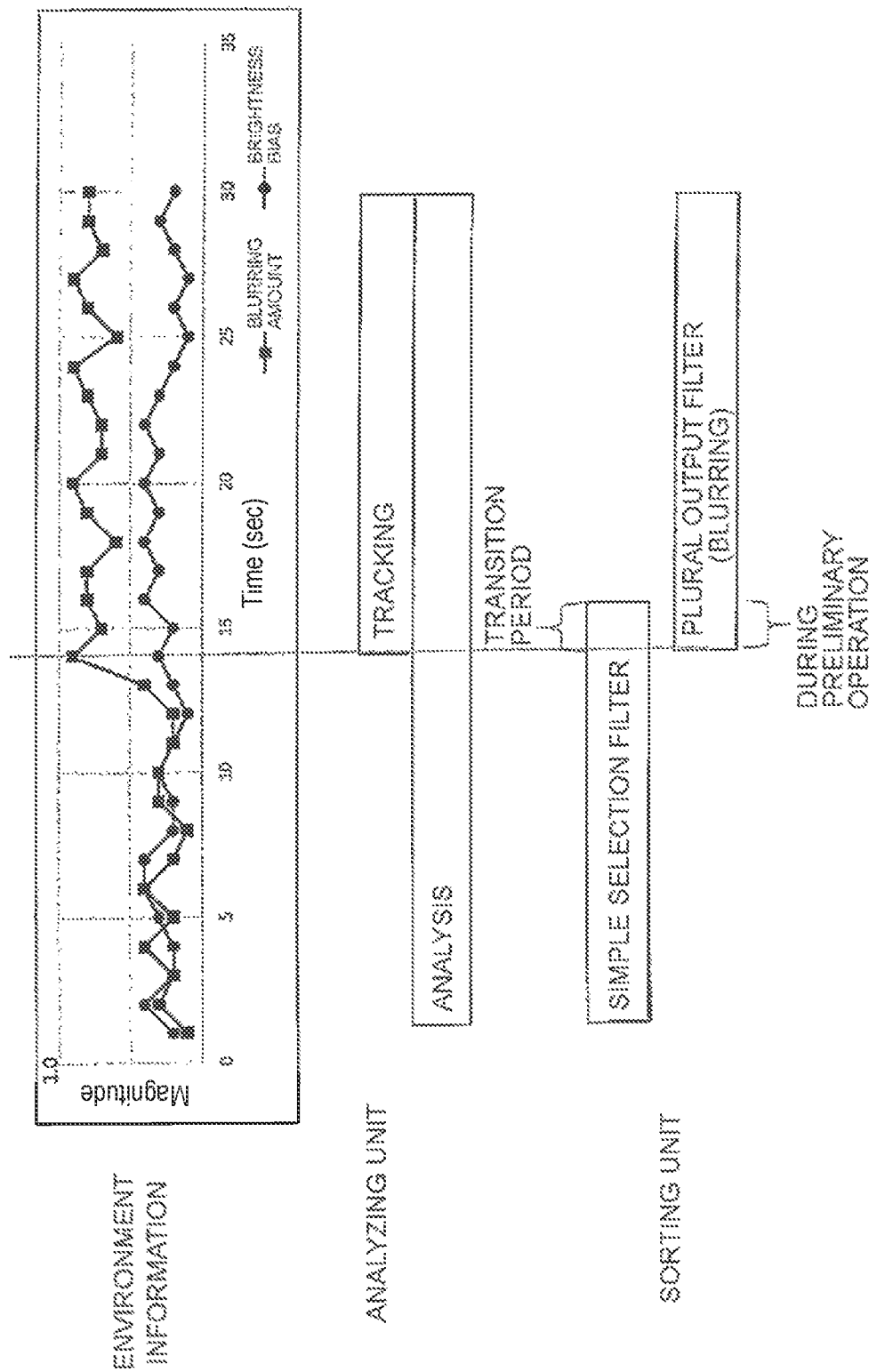
FIG. 13 is a view for explaining an example of integration processing for plural sorting processing by a result integration unit of the image analysis device illustrated in FIG. 10.

The blurring amount is as large as 0.9 at a time instant 14 in FIG. 13. Therefore, the sorting selection unit 350 selects the third sorting unit 370-3 using the plural output filter because a rule for the plural output filter (blurring) is satisfied in the environment information-sorting function correspondence rule in FIG. 6.

Based on the transition time interval of the sorting characteristic information in FIG. 5, the sorting selection unit 350 decides to execute the simple selection filter also during 2,000 milliseconds until the plural output filter (blurring) is stabilized, and instructs the analyzing unit 320 to start tracking analysis and the result integration unit 390 to prioritize the result of the first sorting unit 370-1 using the simple selection filter.

The result integration unit 390 produces, in accordance with the instruction of the sorting selection unit 350, only the result of the first sorting unit 370-1 using the simple selection filter among outputs of the two sorting units 370.

At a time instant 16 in FIG. 13, the sorting selection unit 350 determines an end of the transition period and stops the use of the first sorting unit 370-1 using the simple selection filter. As a result, the result integration unit 390 produces the result of the one sorting unit 370 (in this example, the third sorting unit 370-3 using the plural output filter) as it is to a latter part. Accordingly, it is possible to use also a sorting algorithm in which an operation immediately after start of the execution is not stabilized.

[Description of Effect]

Next, an effect of the second example embodiment will be described.

According to the second example, the sorting selection unit 350 selects one or more sorting units 370 and the result integration unit 390 integrates the results of the plurality of sorting units 370. Therefore, it is possible to achieve higher accuracy by the sorting algorithm requiring a long initialization time interval and integration of a plurality of kinds of sorting.

Respective parts (respective components) of the image analysis device 300A may be implemented by using a combination of hardware and software, as shown in FIG. 3. In a form in which the hardware and the software are combined, the respective parts (the respective components) are implemented as various kinds of means by storing an image analysis program in the program memory 240 and making the hardware of the CPU 220 operate based on the image analysis program. The image analysis program may be recorded in a recording medium to be distributed. The program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned second example in another expression, the second example can be implemented by making a computer to be operated as the image analysis device 300A act as the data input unit 310, the analyzing unit 320, the sorting switching unit 330, the environment analysis unit 340, the sorting selection unit 350, the characteristic storage unit 360, the plurality of sorting units 370, the data output unit 380, and the result integration unit 390 according to the image analysis program stored in the program memory 240.

Example 3

Now, a third example of this invention will be described. The third example is an example in which the above-mentioned image analysis devices 100, 300, and 300A are applied to an intelligent camera 500.

Figure 14:
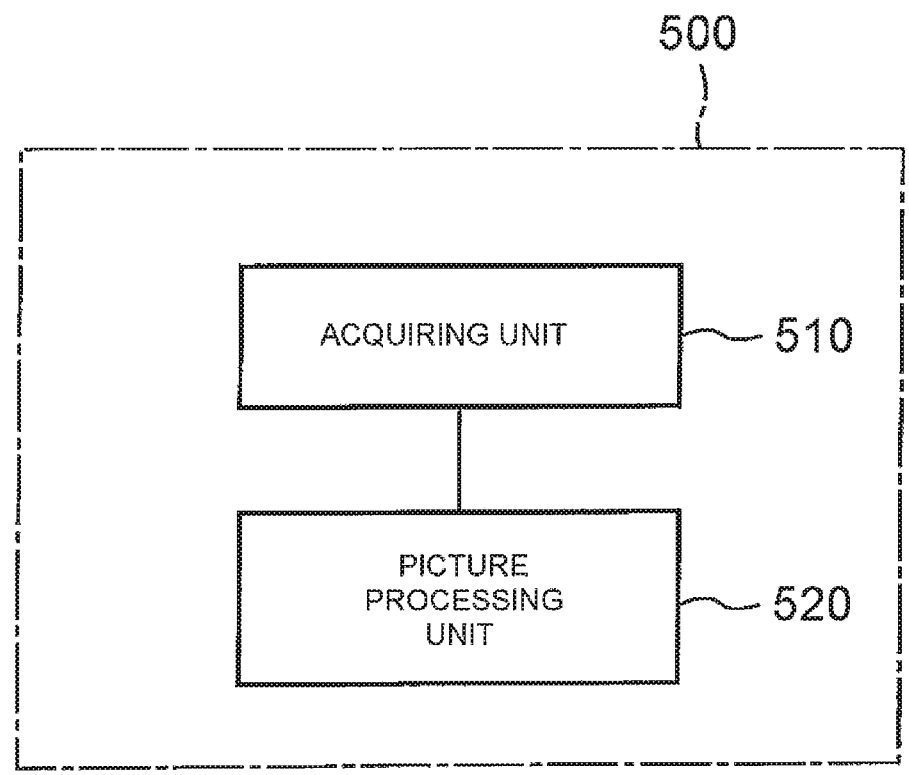
FIG. 14 is a block diagram for illustrating a configuration of an intelligent camera according to a third example of this invention.
Figure 15:
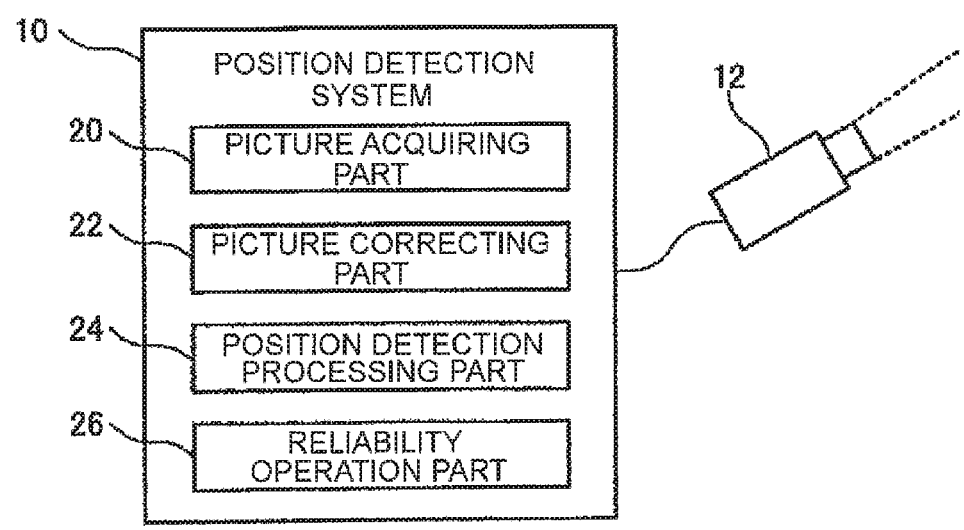
FIG. 15 is a block diagram for illustrating a configuration of an image analysis system disclosed in Patent Literature 1.

FIG. 14 is a block diagram for illustrating a configuration of the intelligent camera 500 according to the third example. The intelligent camera 500 illustrated in the figure incorporates an acquiring unit 510 and a picture processing unit 520. The acquiring unit 510 acquires an image. The picture processing unit 520 serves as any of the above-mentioned image analysis devices 100, 300, and 300A.

This invention is not limited to the configurations of the above-mentioned example embodiments (the examples), and this invention involves any changes in a range not departing from the gist of this invention.

While this invention has been described with reference to the example embodiments and examples thereof, this invention is not limited to the foregoing example embodiments and examples. The configurations and the details of this invention may be modified within the scope of this invention in various manners which could be understood by those of ordinary skill.

INDUSTRIAL APPLICABILITY

This invention is applicable to uses such as an analysis system for analyzing the image or the picture data with high accuracy or a program for achieving the analysis system by a computer. In addition, this invention is also applicable to an analysis device in a surveillance system such as street surveillance in the streets or a program for achieving the analysis device by a computer.

REFERENCE SIGNS LIST 100 image analysis device
110-1, 110-2, 110-N process execution unit
120 analysis unit
130 process selection unit
200 image analysis device
210 A/D converter
220 CPU
230 work memory
240 program memory
300, 300A image analysis device
310 data input unit
320 analyzing unit
330 sorting switching unit
340 environment analysis unit
350 sorting selection unit
360 characteristic storage unit
370-1, 370-2 sorting unit
380 data output unit
390 result integration unit
400 face authentication device
420 processing unit
422 face detection unit
424 feature extraction unit
426 collation unit 440 storage unit
442 database
500 intelligent camera
510 acquiring unit
520 picture processing unit

What is claimed is:

1. An image analysis device comprising:
a plurality of process executors configured to be capable of executing different processes on an image inputted from a data acquiring device;
an analyzer configured to analyze, on the basis of the image, a variation of the image caused by an external environment;
an analyzing executor configured to execute analyzing processing for extracting information from object data of the image; and
a process selector configured to select, on the basis of the analyzed variation, at least one process executor from the plurality of process executors,
wherein the external environment is an installation position of the data acquiring device and surrounding weather of the data acquiring device,
wherein the plurality of process executors comprise a plurality of first sorters which have sorting algorithms different from each other and each of which sorts out good quality data from an analyzed result of the analyzing executor,
wherein the analyzer comprises an environment analyzer configured to extract environment information from the object data of the image, and a characteristic storage configured to memorize sorting characteristics of the plurality of first sorters,
wherein the process selector comprises a sorting selector configured to select, as a selected sorter, one of the plurality of first sorters to be used,
wherein the sorting selector is configured to detect a variation of an environmental condition based on the environment information and to select, on the basis of the sorting characteristics stored in the characteristic storage, the selected sorter which is optimum for the environmental condition.

2. The image analysis device as claimed in claim 1, wherein the sorting selector is configured to calculate, after selecting the optimal selected sorter based on the environment information, a preliminary operation period of the selected sorter that is required for switching of the first sorters, and is configured to switch the first sorters after performing a preliminary operation during the preliminary operation period.

3. The image analysis device as claimed in claim 1,
wherein the sorting selector selects a plurality of second sorters from the plurality of first sorters on the basis of the environment information,
wherein the image analysis device further comprises a result integrator configured to integrate results of the plurality of second sorters.

4. The image analysis device as claimed in claim 1, wherein the environment analyzer is configured to extract, as the environment information, blurring and brightness in the image.

5. An intelligent camera incorporating:
an acquirer configured to acquire an image; and
a picture processor configured to operate as the image analysis device claimed in claim 1.

6. A face authentication device comprising:
a database configured to register reference features indicative of features of faces of persons to be authenticated;
a face detector configured to detect a face from the image using the image analysis device claimed in claim 1;
a feature extractor configured to extract a feature of the detected face; and
a collator configured to collate the extracted feature with the reference features to carry out face authentication.

7. An image analysis method comprising:
analyzing by an analyzer, on the basis of an image inputted from a data acquiring device, a variation caused by an external environment;
executing, by an analyzing executor, analyzing processing for extracting information from object data of the image; and
selecting by a process selector, on the basis of the analyzed variation, at least one process executor from a plurality of process executors which are capable of executing different processes on the image,
wherein the external environment is an installation position of the data acquiring device and surrounding weather of the data acquiring device,
wherein the plurality of process executors comprise a plurality of first sorters which have sorting algorithms different from each other and each of which sorts out good quality data from an analyzed result of the analyzing executor,
wherein the analyzer comprises an environment analyzer configured to extract environment information from the object data of the image, and a characteristic storage configured to memorize sorting characteristics of the plurality of first sorters,
wherein the process selector comprises a sorting selector configured to select, as a selected sorter, one of the plurality of first sorters to be used,
wherein the sorting selector is configured to detect a variation of an environmental condition based on the environment information and to select, on the basis of the sorting characteristics stored in the characteristic storage, the selected sorter which is optimum for the environmental condition.

8. A non-transitory computer readable recording medium for storing an image analysis program for causing a computer to execute:
a process for analyzing by an analyzer, on the basis of an image inputted from a data acquiring device, a variation caused by an external environment;
a process for executing, by an analyzing executor, analyzing processing for extracting information for object data of the image, and
a process for selecting by a process selector, on the basis of the analyzed variation, at least one process executor from a plurality of process executors which are capable of executing different processes on the image,
wherein the external environment is an installation position of the data acquiring device and surrounding weather of the data acquiring device,
wherein the plurality of process executors comprise a plurality of first sorters which have sorting algorithms different from each other and each of which sorts out good quality data from an analyzed result of the analyzing executor,
wherein the analyzer comprises an environment analyzer configured to extract environment information from the object data of the image, and a characteristic storage configured to memorize sorting characteristics of the plurality of first sorters, wherein the process selector comprises a sorting selector configured to select, as a selected sorter, one of the plurality of first sorters to be used, wherein the sorting selector is configured to detect a variation of an environmental condition based on the environment information and to select, on the basis of the sorting characteristics stored in the characteristic storage, the selected sorter which is optimum for the environmental condition.

* * * * *